Feb. 18, 1958 J. BRODY 2,823,736
BREATHERS FOR PLASTIC AUTO SEAT COVERS
Filed Oct. 22, 1954 2 Sheets-Sheet 1
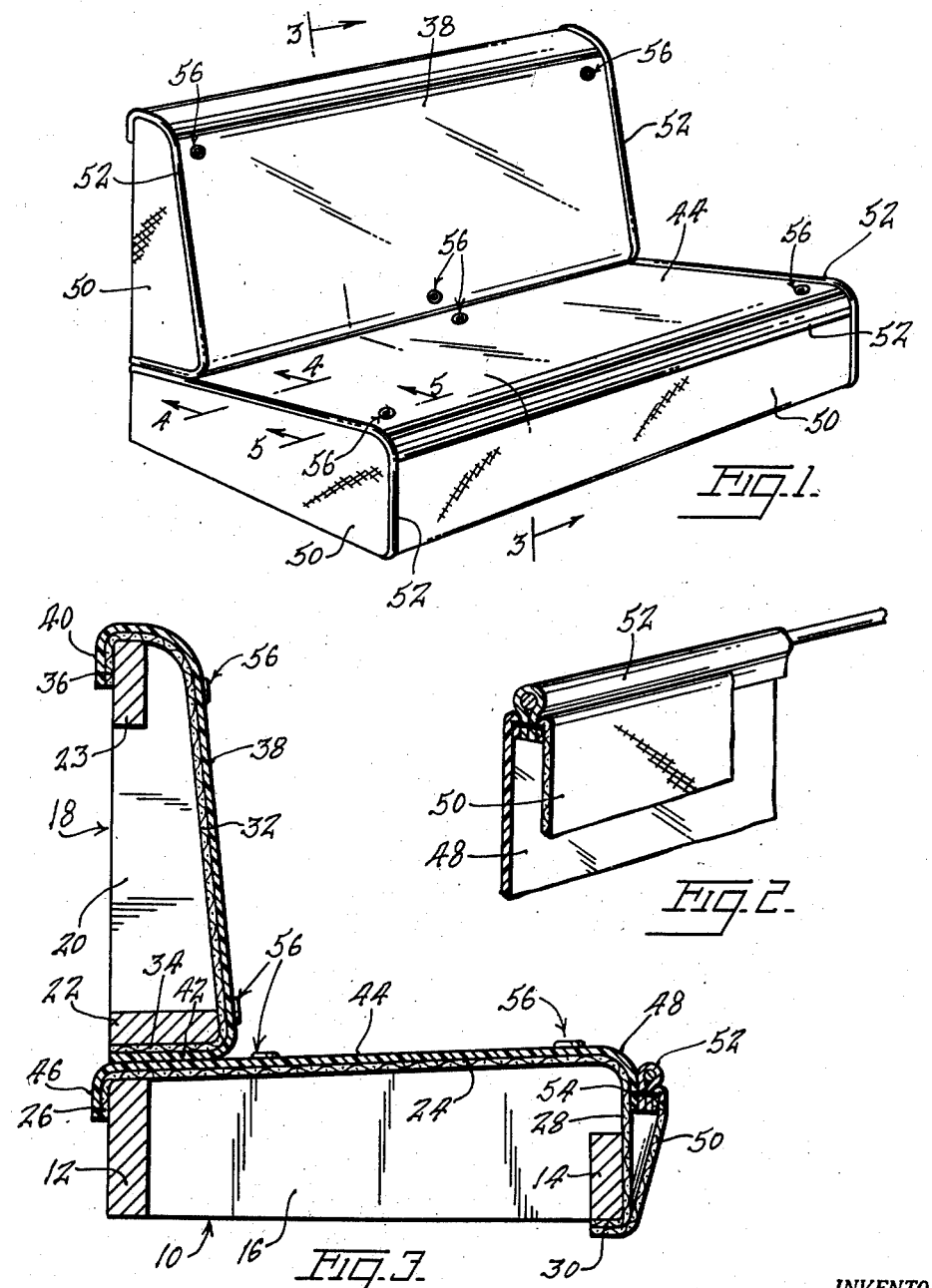
INVENTOR.
JOSEPH BRODY
BY
ATTORNEY Feb. 18, 1958 J. BRODY 2,823,736
BREATHERS FOR PLASTIC AUTO SEAT COVERS
Filed Oct. 22, 1954 2 Sheets-Sheet 2

INVENTOR.
JOSEPH BRODY
BY
ATTORNEY

United States Patent Office 2,823,736
Patented Feb. 18, 1958

2,823,736

BREATHERS FOR PLASTIC AUTO SEAT COVERS

Joseph Brody, Fresh Meadows, N. Y.

Application October 22, 1954, Serial No. 463,963

1 Claim. (Cl. 155—182)

This invention relates to seat covers for automobiles. More particularly, the invention has reference to a breather device mountable in a seat cover of this type, so as to prevent deterioration of the texture of the upholstery of the vehicle, which deterioration otherwise tends to occur when said upholstery is covered by plastic material that is wholly impervious to air.

Among important objects of the invention are the following:

To provide a device as described which can be mounted in a seat cover at any desired location;

To so design the breather device as to cause the same to be comparatively inconspicuous;

To locate the breathing device at points where it will be particularly adapted to aerate the vehicle upholstery; and In at least one form of the invention, to so design the device as to eliminate the possibility of the same constituting an uncomfortable projection that might be felt by one seated in the vehicle.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of an automobile seat having a plastic seat cover provided with a plurality of breather units formed in accordance with the present invention.

Fig. 2 is a fragmentary, enlarged perspective view of the front edge portion of the seat.

Fig. 3 is a transverse sectional view substantially on line 3—3 of Fig. 1.

Figure 4:
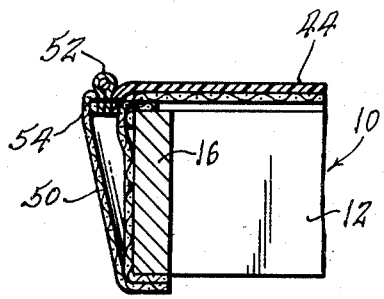
Fig. 4 is an enlarged, detail sectional view on line 4—4 of Fig. 1.
Figure 5:
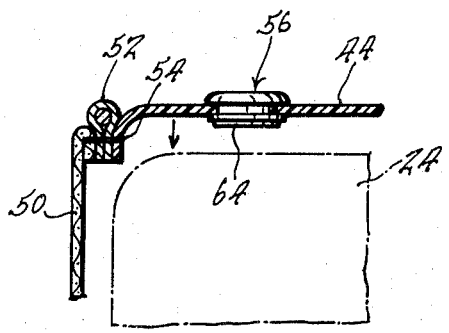
Fig. 5 is an enlarged detail sectional view on line 5—5 of Fig. 1.
Figure 6:
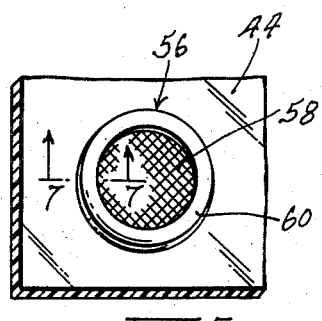
Fig. 6 is a fragmentary perspective view of the seat cover, the scale being still further enlarged, showing one of the breather units.
Figure 7:
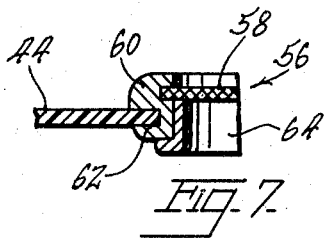
Fig. 7 is a detail sectional view, still further enlarged, substantially on line 7—7 of Fig. 6.

A conventional automobile seat 10 is illustrated, and includes a seat portion having a longitudinal back frame member 12 lying in a vertical plane, a longitudinal front frame member 14 also lying in a vertical plane and lower in height than the back frame member, and end upholstery coverings 16. It will be understood that the seat portion, as well as a back rest portion 18, will be equipped with suitable, springing, foam rubber cushions, or equivalent interiorly disposed cushioning means, in the regular manner.

The back rest portion 18 includes an upholstery covering 20, and longitudinal frame members 22, 23.

The seat rest portion is covered with upholstery material 24, having at its back edge a depending rear edge portion 26 secured to the back of the rear frame member 12, and having at its front a depending front portion 28 terminating at its lower edge in a rearwardly turned edge part 30 secured to the underside of frame member 14. All this is intended to represent a conventional showing of an upholstered vehicle seat. The back rest portion has the usual upholstery cover 32 terminating at its lower edge in an edge portion 34 engaged under frame member 22, and terminating at its upper edge in a top edge portion 36 attached to frame member 23. Again, this is a conventional showing and does not per se constitute part of the present invention.

When upholstery of a vehicle seat is covered by an imperforate plastic, such as vinyl, impervious to the passage of air, the upholstery, since its finished surface or outwardly faced nap is not aired, tends to deteriorate in respect to its texture. Accordingly, the plastic seat cover constituting the present invention is so designed as to incorporate breather units in material of the type referred to, which breather units will tend to continuously air out the upholstery, so that it will not deteriorate.

A back rest seat cover 38 formed of a plastic material of the type referred to, completely covers the back rest upholstery 32, and has at its top end a depending edge portion 40 overlying edge portion 36 and secured in place in any suitable manner well known in the art of covering vehicle seat upholstery. A lower edge portion 42 of cover 38 is engaged under portion 34 of the vehicle seat cover.

A seat portion cover 44, formed of the same plastic material, has a back edge portion 46 overlying portion 26 of the vehicle seat upholstery, and a depending front end portion 48. A front seat portion 50 of plastic material overlaps portion 48, and interposed therebetween is piping or welting 52, stitching 54 extending through said welting and through the portions 48, 50.

The breather units have been designated generally at 56, and since they are all alike, the description of one will suffice for all. These units are preferably disposed at the upper corners of the back rest, and medially between the opposite side of the back rest adjacent the lower edge thereof. Further, units are disposed at the front corners of the seat portion, and medially between the opposite sides of the seat portion adjacent the back edge thereof.

Each breather unit 56 is of grommet-like construction, and includes a circular screen element 58 of wire mesh or the like, engaged in an inwardly facing, circumferential groove formed in a metal mounting ring 60, the outer edge of which has an outwardly facing circumferential groove 62 receiving the edge portion of a provided opening formed in the plastic material.

A retaining ring 64, having an outwardly directed circumferential flange at its lower end engaging against the underside of mounting ring 60, exerts pressure against the peripheral portion of the screen element, to hold the same in place, and is frictionally engaged within the mounting ring.

A breather unit so formed has its screen element disposed above the adjacent surface of the upholstery, thus to define a cavity through which air may pass, to aerate the upholstery. Of course, the use of the vehicle seat causes air to be forced outwardly through the breather unit when one sits down upon the seat. Subsequently, after the pressure of the person upon the vehicle seat is relieved, air will rush back through the screen element, to aerate the upholstery.

Figure 9:
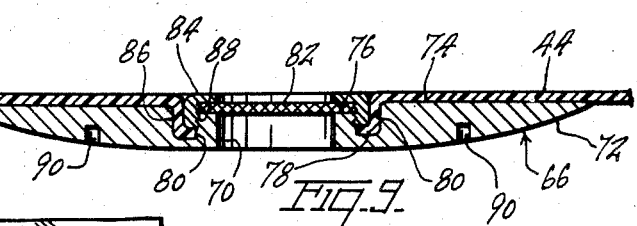
Fig. 9 is an enlarged sectional view on line 9—9 of Fig. 8.
Figure 8:
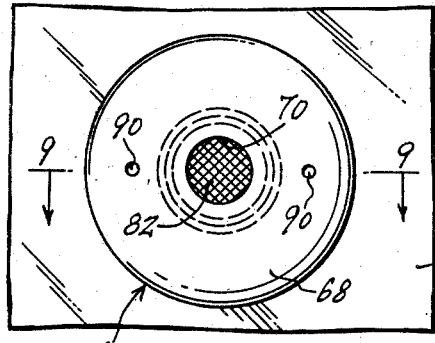
Fig. 8 is a bottom plan view of a modified form of breather unit.

In Figs. 8 and 9 a modified form of breather unit designated generally at 66 is shown. This unit is so designed as to eliminate the formation of an undesirable projection, which may cause discomfort to one seated upon the vehicle seat. By use of a breather unit as formed in Figs. 8 and 9, the unit need not necessarily be disposed at locations on the vehicle seat where it would not be pressed against by a passenger. Rather, the unit can be freely disposed over the area of the vehicle seat, both in the back rest and seat portion, since the unit is of flattened formation, being feathered out toward its periphery or tapered, so as to merge smoothly into the plastic material and thus eliminate the formation of an undesirable projection.

This unit includes a flattened, disc-shaped body 68 constituting a retaining member, and having a center opening 70. The body decreases progressively in thickness in a radial direction, toward its outer edge, so that the outer edge portion of the body is of tapered cross section, the body having an underside 72 which is shallowly conically shaped, said body having a flat top surface 74 merging at the periphery of the body into the conically shaped underside 72.

The surface 74 lies in a plane higher than the plane of an inner edge surface 76 extending about opening 70, and between the surfaces 74, 76 there is formed an annular, upwardly facing recess 78 in the retaining member, receiving the edge portion 80 of a provided opening in the plastic material of the seat cover.

A circular screen element 82 has its edge portion seated upon the surface 76, the diameter of the screen element coresponding to the inner diameter of recess 78. A ring 84 has a flat, inwardly directed circumferential lip overlying the marginal part of the screen element 82, said lip at its outer edge merging into a depending, internally threaded circumferential flange 86 extending into recess 78, and deforming the edge portion 80 of the plastic material into an L-shaped cross section, with said edge portion being held in the recess by the ring 84. The inner wall of the recess 78 is threaded as at 88 complementarily to the threads of the flange 86, so as to assemble the parts of the breather unit with the plastic material.

Diametrically opposite recesses 90 in body 68 are adapted to receive a spanner wrench, not shown.

The device shown in Figs. 8 and 9 would be of a maximum diameter of perhaps 2 inches, and a maximum thickness of approximately ¼ inch. The device so formed can be located wherever desired in the upholstery seat cover, and even when sat directly upon, will not cause discomfort to the seated individual.

It is to be understood that this breather unit may be of any desired color, shape, size and material, and the screen may be of a suitable mesh, placed at various locations on the vehicle seat cover. The cover may also be finished in any color or combination of designs and be made of plastic, composition, or like suitable material.

This arrangement can be used to cover any furniture, such as chairs, divans, etc. or any other article.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

A cover for vehicles comprising an upholstery-overlying body of air-impervious plastic material, and means in said body forming openings through which the upholstery may be vented to atmosphere, each of said means including a screen element extending across the opening associated therewith, said means further including a disc-like, flat body having a central opening and carrying said screen element, said disc-like body being under said plastic body and being reduced progressively in thickness in a radial direction toward its outer periphery, and being tapered to a substantially sharpened outer edge to merge into the material of the plastic body, said disc-like body having a shallowly conical bottom surface and a flat top surface to impart a radially and outwardly directed taper to said disc-like body, said disc-like body additionally including a flattened inner edge surface offset downwardly from said flat top surface of the body and extending about said screen element, the screen element being supported upon said inner edge surface in the central opening of the disc-like body, the disc-like body having an upwardly facing, annular recess between the flat top surface and inner edge surface thereof, said recess receiving the edge portion of the opening of the plastic body of the cover, each means further including a ring having an inwardly directed circumferential lip overlying the marginal part of the screen element to hold the same against said downwardly offset inner edge surface, said ring having a depending, internally threaded flange extending into the recess to hold the edge portion of the plastic body opening in said recess, the recess having a wall threaded to engage said ring, the outer surface of said ring being flush with the body of plastic material.

References Cited in the file of this patent

UNITED STATES PATENTS

| | | |
|---|---|---|
| 389,420 | Sutton | Sept. 11, 1888 |
| 877,692 | Wyman | Jan. 28, 1908 |
| 1,262,510 | Kelly | Apr. 9, 1918 |
| 2,012,042 | Gerlofson et al. | Aug. 20, 1935 |
| 2,059,226 | Gates | Nov. 3, 1936 |
| 2,131,212 | Bechik | Sept. 27, 1938 |
| 2,139,803 | Cavicchi | Dec. 13, 1938 |
| 2,652,886 | Richards | Sept. 22, 1953 |